M. RIGELL.
Insect Traps.
No. 135,366.  Patented Jan. 28, 1873.
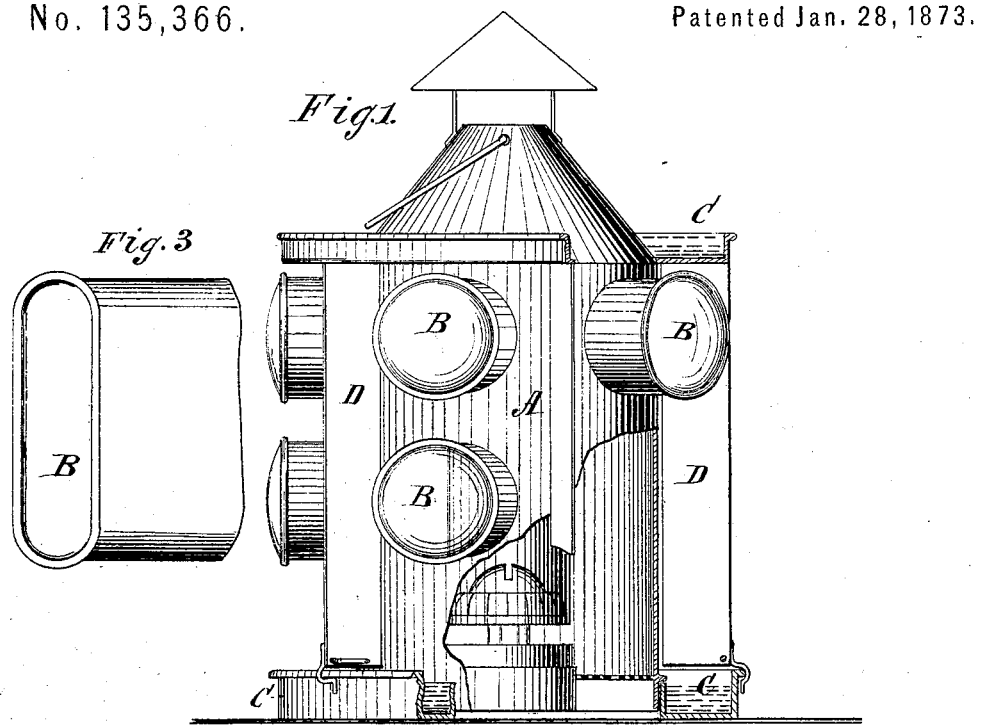
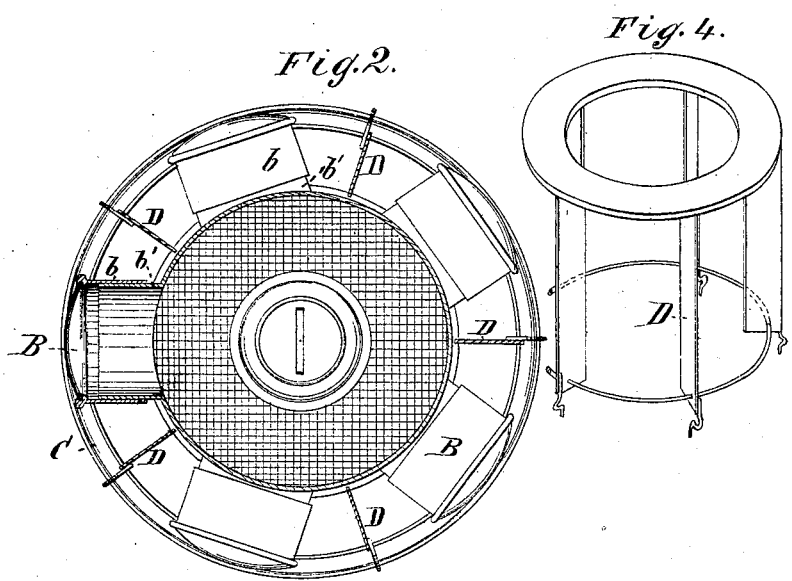
Witnesses:
G. Matthys
John E Hanow
Inventor:
Mark Rigell
Per _____
Attorneys.

UNITED STATES PATENT OFFICE.

MARK RIGELL, OF NEWTON, ALABAMA.

IMPROVEMENT IN INSECT-TRAPS.

Specification forming part of Letters Patent No. 135,366, dated January 28, 1873.

*To all whom it may concern:*

Be it known that I, MARK RIGELL, of Newton, in the county of Dale and State of Alabama, have invented a new and Improved Insect-Trap; and I do hereby declare the following to be a full, clear, and exact description of the same, reference being had to the accompanying drawing forming a part of this specification.

The invention relates to means for catching insects; and consists in a lantern provided with projecting round or oblong windows, arranged around it so as to throw the rays of light in all directions, and with a subjacent circular dish to receive some liquid. It also consists in the application thereto of a series of vertical plates, one arranged between each pair of windows, to serve as reflectors for spreading the light, and also as guides to conduct the insect down into the liquid. It also consists in cup-shaped windows, made round or oblong and detachable, so as to be conveniently and easily cleaned.

In the drawing, Figure 1 is a side elevation with parts broken out. Fig. 2 is a horizontal section. Fig. 3 is a detail view of a window, and Fig. 4 is a perspective view of the reflectors.

A represents the body of the lantern, which is preferably made round and provided on its sides with the projecting windows B, which may be made round or oblong, as shown, and with glass or metallic sides. C is a circular dish placed about the bottom and top of lantern-body, and above and beneath the windows. The device operates very well with the lower dish only. D is a series of vertical plates or reflectors. When the projecting windows are made of glass the light strikes laterally upon these plates and is reflected in many directions. The windows B will need to be cleaned at suitable intervals, and to facilitate this operation I make each of them in two parts, $b\ b'$, one of which is easily slipped over the other or removed therefrom.

The operation of this device is as follows: The lantern is placed in locations where insects abound, when they are attracted by the light from all sides. Myriads fly toward and against the lantern and vertical plates, when they are precipitated into the liquid and drowned.

Having thus described my invention, what I claim as new, and desire to secure by Letters Patent, is—

1. A lantern for insect-traps provided with a series of windows arranged therearound, as shown and described, and for the purpose set forth.

2. The vertical plates D, combined with dishes and windows of the lantern, as and for the purpose set forth.

3. The detachable window B, made round or oblong and entirely of glass, as and for the purpose specified.

MARK RIGELL.

Witnesses:
SOLON C. KEMON,
G. MATHYS.